June 6, 1944.                W. H. FRANK ET AL                2,350,601
                          ELECTRICAL DISTRIBUTION SYSTEM
                              Filed Nov. 17, 1941
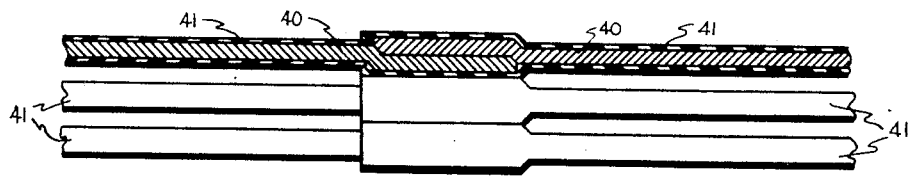
*Fig. 2.*
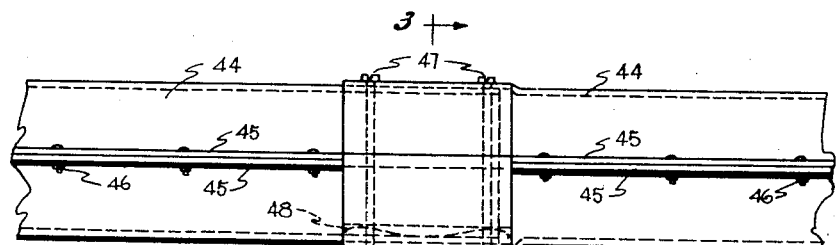
*Fig. 1*
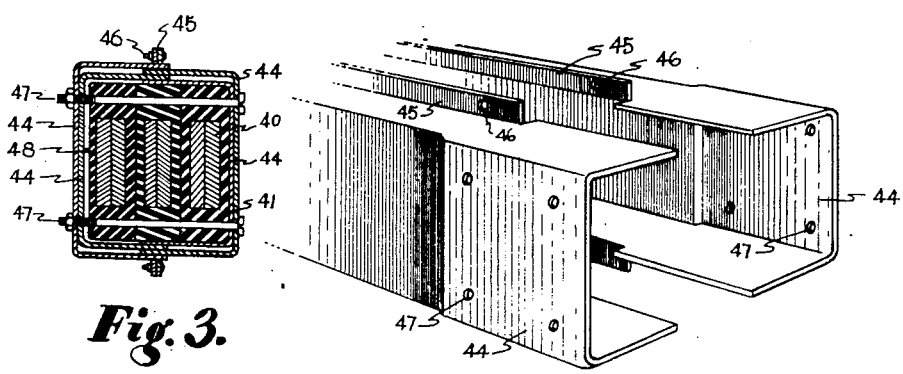
*Fig. 3.*                                    *Fig. 4.*
                                                    INVENTORS.
                                            William H. Frank
                                    BY      Lawrence E. Fisher
                                            Daniel G. Cullen
                                                    ATTORNEY.

Patented June 6, 1944

2,350,601

UNITED STATES PATENT OFFICE 2,350,601

ELECTRICAL DISTRIBUTION SYSTEM

William H. Frank and Lawrence E. Fisher, Detroit, Mich., assignors to Bulldog Electric Products Company, Detroit, Mich., a corporation of West Virginia Application November 17, 1941, Serial No. 419,506

7 Claims. (Cl. 174—84)

This application discloses a novel form of bus bar system.

The system hereof is characterized by being of low impedance and low temperature rise—and by being very compact.

An understanding of the system disclosed herein will best be obtained from a reading of the specification which follows and which refers to the appended drawing. In this drawing, Fig. 1 is a side view, at a joint, of an embodiment of the bus bar system.

Fig. 2 is a similar view with the housing omitted and with the wrapping of one bus run being partly cut away.

Fig. 3 is a section as if on line 3—3 of Fig. 1.

Fig. 4 is a fragmentary view of the housing.

Figs. 1-4 show a system wherein meeting ends of bus bars 40 are offset to provide lap joints, with the bus runs being covered by insulation wrappings 41 which surround the bus bars and their lap joints and which include separate sections, one for each bus bar, the end of one section of wrapping being telescoped, with its bus bar end, into the expanded end of another bus bar wrapping, covering its bus bar, as clearly shown in Fig. 2.

The housing for each section of the system includes two portions 44, indicated best in Fig. 4; these have lateral meeting flanges 45 for receiving joining bolts 46 passing through them. One of the two ends of each section of housing is expanded as shown in Fig. 1 to receive the unexpanded end of the housing of an adjoining section to form an end to end joint, and joining bolts 47 are utilized to clamp the two sections to each other, the bolts passing through the expanded end of one section and the unexpanded end of the other. A leaf spring 48 disposed in the space between a bus bar joint and the adjacent wall of the unexpanded end of the housing is provided for assisting in securing the parts in a firm assembly.

We claim:

1. A bus bar system comprising lengths, joined end to end, each length comprising a length of housing, and lengths of bus bar therein, adjacent housing ends lapping for forming lap joints, with bolts extending transversely of the run for clamping adjacent housing ends together, and adjacent bus bar ends terminating at and lapping for joining at the housing joints, and being clamped against one another by said housing clamping bolts.

2. A bus bar system comprising lengths, joined end to end, each length comprising a length of housing, and lengths of bus bar therein, adjacent housing ends lapping for forming lap joints, with bolts extending transversely of the run for clamping adjacent housing ends together, and adjacent bus bar ends terminating at and lapping for joining at the housing joints, and being clamped against one another by said housing clamping bolts, the housing lengths being divided longitudinally into sections and transversely extending bolts for intersecuring sections of each housing length to form a unitary housing length.

3. A bus bar system comprising lengths, joined end to end, each length comprising a length of housing, and lengths of bus bar therein, adjacent housing ends lapping for forming lap joints, with bolts extending transversely of the run for clamping adjacent housing ends together, and adjacent bus bar ends terminating at and lapping for joining at the housing joints, and being clamped against one another by said housing clamping bolts, the bus bars having insulation coverings thereon, divided so as to terminate at and lap for joining at the housing and bus bar joints, and being clamped against one another by said housing clamping bolts.

4. A bus bar system comprising lengths, joined end to end, each length comprising a length of housing, and lengths of bus bar therein, adjacent housing ends being telescopically joined, with bolts extending transversely of the run for clamping adjacent housing ends together, and adjacent bus bar ends terminating at and lapping for joining at the housing joints, and being clamped against one another by said housing clamping bolts.

5. A bus bar system comprising lengths, joined end to end, each length comprising a length of housing, and lengths of bus bar therein, adjacent housing ends lapping for forming lap joints, with bolts extending transversely of the run for clamping adjacent housing ends together, and adjacent bus bar ends terminating at and lapping for joining at the housing joints, and being clamped against one another by said housing clamping bolts, the housing lengths being divided longitudinally into sections and transversely extending bolts for intersecuring sections of each housing length to form a unitary housing length, the sections of the housing lengths having outwardly extending flanges through which pass the bolts for intersecuring the sections to form housing lengths, such bolts being outside of the housing lengths.

6. A bus bar system comprising lengths, joined end to end, each length comprising a length of housing, and lengths of bus bar therein, adjacent housing ends lapping for forming lap joints, with bolts extending transversely of the run for clamping adjacent housing ends together, and adjacent bus bar ends terminating at and lapping for joining at the housing joints, and being clamped against one another by said housing clamping bolts, the housing lengths being divided longitudinally into sections and transversely extending bolts for intersecuring sections of each housing length to form a unitary housing length, the sections of the housing lengths having outwardly extending flanges through which pass the bolts for intersecuring the sections to form housing lengths, such bolts being outside of the housing lengths, with the bolts for inter-clamping adjacent housing ends being within the housing ends.

7. In combination, an insulated bus bar construction comprising parallel completely insulated bus bars having wide faces and thin edges, the bus bars being arranged face near face, throughout their length, and elongated sheet metal flanged channels on opposed sides of the insulated bus bar construction, the channels being arranged to open towards each other so that their flanges embrace the insulated bus bar constructions, paralleling the edges of the bus bars, the webs of the channels being parallel to the bus bar faces, and longitudinally spaced means extending transversely of the insulated bus bar construction and of the bus bar faces for connecting the webs of the channels to hold the insulated bus bar construction and the channels in a unitary rigid structure, the dimensions of the channels and the insulated bus bar construction being such that at certain points of their run, the insulation and the bus bars fill the channels and there are no voids within the insulated bus bar construction at such points, certain bus faces engaging at such points in lap joints and clamped against each other by said means.

WILLIAM H. FRANK.
LAWRENCE E. FISHER.